(12) United States Patent
Heiden

(10) Patent No.: US 6,789,193 B1
(45) Date of Patent: Sep. 7, 2004

(54) METHOD AND SYSTEM FOR AUTHENTICATING A NETWORK USER

(75) Inventor: Richard W. Heiden, Huntington, CT (US)

(73) Assignee: Pitney Bowes Inc., Stamford, CT (US)

( * ) Notice: Subject to any disclaimer, the term of this patent is extended or adjusted under 35 U.S.C. 154(b) by 536 days.

(21) Appl. No.: 09/698,420

(22) Filed: Oct. 27, 2000

(51) Int. Cl.⁷ .............................. H04L 9/32; H04L 9/00
(52) U.S. Cl. ...................... 713/175; 713/201; 713/153; 705/76
(58) Field of Search ................................ 713/201, 153, 713/156, 158, 166, 175, 168, 186, 150; 380/30, 286; 705/76, 410; 455/410

(56) References Cited

U.S. PATENT DOCUMENTS

| | | | |
|---|---|---|---|
| 4,024,380 A | 5/1977 | Gunn | 235/432 |
| 5,097,528 A | 3/1992 | Gursahaney et al. | 379/67 |
| 5,261,002 A | 11/1993 | Perlman et al. | |
| 5,265,145 A | 11/1993 | Lim | 379/88 |
| 5,311,577 A | 5/1994 | Madrid et al. | 379/93 |
| 5,333,152 A | 7/1994 | Wilber | 379/98 |
| 5,341,414 A | 8/1994 | Popke | 379/142 |
| 5,343,516 A | 8/1994 | Callele et al. | 379/98 |
| 5,394,461 A | 2/1995 | Garland | 379/106 |
| 5,467,385 A | 11/1995 | Reuben et al. | 379/88 |
| 5,506,897 A | 4/1996 | Moore et al. | 379/220 |
| 5,677,955 A | 10/1997 | Doggett et al. | |
| 5,745,574 A | 4/1998 | Muftic | |
| 5,799,086 A * | 8/1998 | Sudia | 705/76 |
| 5,884,158 A * | 3/1999 | Ryan et al. | 455/410 |
| 5,943,658 A * | 8/1999 | Gravell et al. | 705/410 |
| 6,049,594 A | 4/2000 | Furman et al. | |
| 6,167,518 A * | 12/2000 | Padgett et al. | 713/186 |
| 6,324,271 B1 * | 11/2001 | Sawyer et al. | 379/142.05 |
| 6,324,645 B1 | 11/2001 | Andrews et al. | |
| 6,327,578 B1 | 12/2001 | Linehan | |
| 6,438,690 B1 | 8/2002 | Patel et al. | |
| 6,463,534 B1 * | 10/2002 | Geiger et al. | 713/168 |
| 6,564,320 B1 | 5/2003 | de Silva et al. | |
| 6,615,347 B1 | 9/2003 | de Silva et al. | |

FOREIGN PATENT DOCUMENTS

EP  0665517 A2  1/1995

\* cited by examiner

*Primary Examiner*—Ly V. Hua
(74) *Attorney, Agent, or Firm*—Brian A. Lemm; Angelo N. Chaclas

(57) ABSTRACT

A method and system for creating a certificate for a client of a service provider of a communications network, wherein the client has a client private key and a client public key. The method includes the steps of establishing a communications link with the service provider through a dedicated communication channel; requesting a client certificate from the service provider; obtaining a caller-ID from an operator of the dedicated communication channel; and creating the requested client certificate using the caller-ID. Preferably, the method also includes the step of verifying that the caller-ID obtained from the operator of the dedicated communication channel is the same as client information provided by the client when requesting the client certificate. The certificate can be stored at a caller ID server or a client's storage.

17 Claims, 4 Drawing Sheets

METHOD AND SYSTEM FOR AUTHENTICATING A NETWORK USER

TECHNICAL FIELD

The present invention is related generally to the use of encrypted information and data for authentication purposes and, in particular, to the authentication of a client of an Internet Service provider (ISP) in on-line applications.

BACKGROUND OF THE INVENTION

In telephone services, when a caller makes a phone call to a called party, it is possible for the called party to identify the caller via a caller ID service provided by the telephone company. With the caller ID service, the telephone number and/or the name of the caller can be provided to the called party, usually as text to be displayed on the called party's terminal, or as caller-ID boxes on dedicated lines.

In on-line applications that use a communication network, such as the Internet or an Internet-like network, it is currently impossible to send caller ID information forward from the service provider with which the client is connected. For example, if a client requests a service or wishes to make a purchase from a supplier through the Internet, it is currently almost impossible to authenticate the client through the Internet. Presently, it is possible to authenticate an individual by way of certificates. A certificate is an electronic document used to identify an individual, a company or some other entity and to associate that identity with a public key. The certificate, which can be issued by a Certificate Authority (CA), binds a particular public key to the name of the entity that the certificate identifies. For that purpose, the certificate always includes the name of the entity, the entity's public key and a digital signature of the issuing CA. As it is well known in the art, a digital signature is a digital signed message. The message serves as a "letter of introduction" for the recipients who know and trust the CA but do not know the entity identified by the certificate. In this case, the message is first converted into a digest by a one-way hash function, and the digest is encrypted with the CA's private key into a digital signature. The digital signature is sent to the message recipient along with a CA's public key certificate and a copy of the original message. In operation, when the CA sends a signed message with a certificate attached thereto, the recipient verifies the authenticity of the certificate by using the CA's public key. The recipient also generates a digest of the message sent using the same one-way hash function and compares this digest with the digital signature decrypted using the CA's public key for an exact match. With this method, the identity of an entity can be authenticated by a certificate. However, before issuing a certificate, the CA must use its published verification procedures for that type of certificate to ensure that an entity requesting a certificate is, in fact, who it claims to be.

Currently, there are a number of ways to obtain public key certificates. Some of these depend on little or no ceremony while others can consume a great deal of time with their ceremonial requirements. Certificates based on the former are easy to get but have more risk associated with their use as compared to the certificates created with greater ceremony.

In each case, the risk involved relates to the level of trust associated with the usage of the certificate. The more effort put into the identification of the certificate owner, the more trust there is in the digital signatures generated from the certificate's associated private key. The level of trust is based on the published Certificate Practice Statement (CPS) that the certificate issuer adheres to when creating a certificate. In the case of this invention, the CPS defines the steps that are performed when using the caller-id in the creation of the certificate. Included in the certificate is a reference to the applicable CPS.

The Internet Engineering Task Force (IETF) Public Key Infrastructure (PKIX) working group has defined standards for certificate management. Specifically, the most common of these standards is referred to as X.509. Other certificate standards include Simple Public Key Infrastructure (SPKI) and Pretty Good Privacy (PGP). The X.509 certificate includes the following information: version, serial number, signature, algorithm identifier, issuer name, validity period, subject name, issuer and authorization attributes. Such certificates are well known to those skilled in the art.

This invention provides a balance between the burden required to obtain the certificate and the risk involved in its use. By using the caller-id feature associated with the use of private communication connections—land based telephone line, Digital Subscriber Line (DSL), etc.—it is possible to create a certificate that is easy for the client to obtain and yet has a high-degree of confidence when used to authenticate the client's behavior.

The problem is that it is difficult to ensure that the entity requesting a certificate is, in fact, who it claims to be. The verification procedures usually involve a variety of complicated registration processes.

Thus, it is advantageous and desirable to provide a simple method to obtain the identity of the entity to be authenticated, so that when the entity requests a service or places an order on the Internet, the identity of the requesting entity can be authenticated.

SUMMARY OF THE INVENTION

The first aspect of the present invention is a method for creating a certificate for a client of a service provider of a communications network wherein the client has a client private key and a client public key. The method comprises the steps of:

establishing a communications link with the service provider through a dedicated communication channel;

requesting a client certificate from the service provider;

obtaining caller identifying information from an operator of the dedicated communication channel; and creating the requested client certificate using the caller identifying information.

Preferably, the method further comprises the step of verifying that the caller identifying information obtained from the operator of the dedicated communication channel is the same as client information provided by the client when requesting the client certificate.

Preferably, the method also includes the step of collecting client information by the service provider, which signs the client information into the certificate, wherein the client information includes a time-stamp for recording the time at which the certificate is created.

Preferably, the method further comprises the steps of retrieving the certificate from the caller ID server prior to verifying the signed challenge and retrieving the certificate from the client's storage prior to verifying the signed challenge.

When the caller ID includes a phone number of a client's telephone at a first site, it is preferable that the method further comprises the steps of:

generating an additional certificate having a value indicative of a communication device used by the client at a second site different from the first site, and verifying the additional certificate with the client public key, wherein the value includes a MAC address of the communication device.

It is possible that the operator of the dedicated communication channel is a telephone company and the caller identifying information is a caller ID.

It is possible that the communications network is the Internet and the service provider is an Internet service provider, and the service provider includes a telephone service company.

The second aspect of the present invention is a system for creating a certificate for a client of a service provider of a communications network wherein the client has a client private key and a client public key. The system comprises:

a dedicated communication channel, for providing a communications link between the client and the service;

a mechanism for providing a first signal via the communications link, requesting a client certificate from the service provider;

a mechanism, in response to the first signal, for obtaining caller identifying information from an operator of the dedicated communication channel, and for providing a second signal indicative of the caller identifying information; and a mechanism, in response to the second signal, creating the requested client certificate using the caller identifying information.

Preferably, the system further comprises a mechanism for verifying that the caller identifying information obtained from the operator of the dedicated communication channel is the same as client information provided by the client when requesting the client certificate.

Preferably, the system further comprises a mechanism for collecting client information by the service provider, which signs the client information into the certificate, wherein the client information includes a time-stamp for recording the time at which the certificate is created.

Preferably, the system further comprises a mechanism for retrieving the certificate from the caller ID server prior to verifying the signed challenge and retrieving the certificate from the client's storage prior to verifying the signed challenge.

When the caller ID includes a phone number of a client's telephone at a first site, it is preferable that the system further comprises:

a mechanism for generating an additional certificate having a value indicative of a communication device used by the client at a second site different from the first site, and for verifying the additional certificate with the client public key, wherein the value includes a MAC address of the communication device.

The present invention will become apparent upon reading the description taken in conjunction with FIGS. 1 to 3.

DETAILED DESCRIPTION

Figure 1:
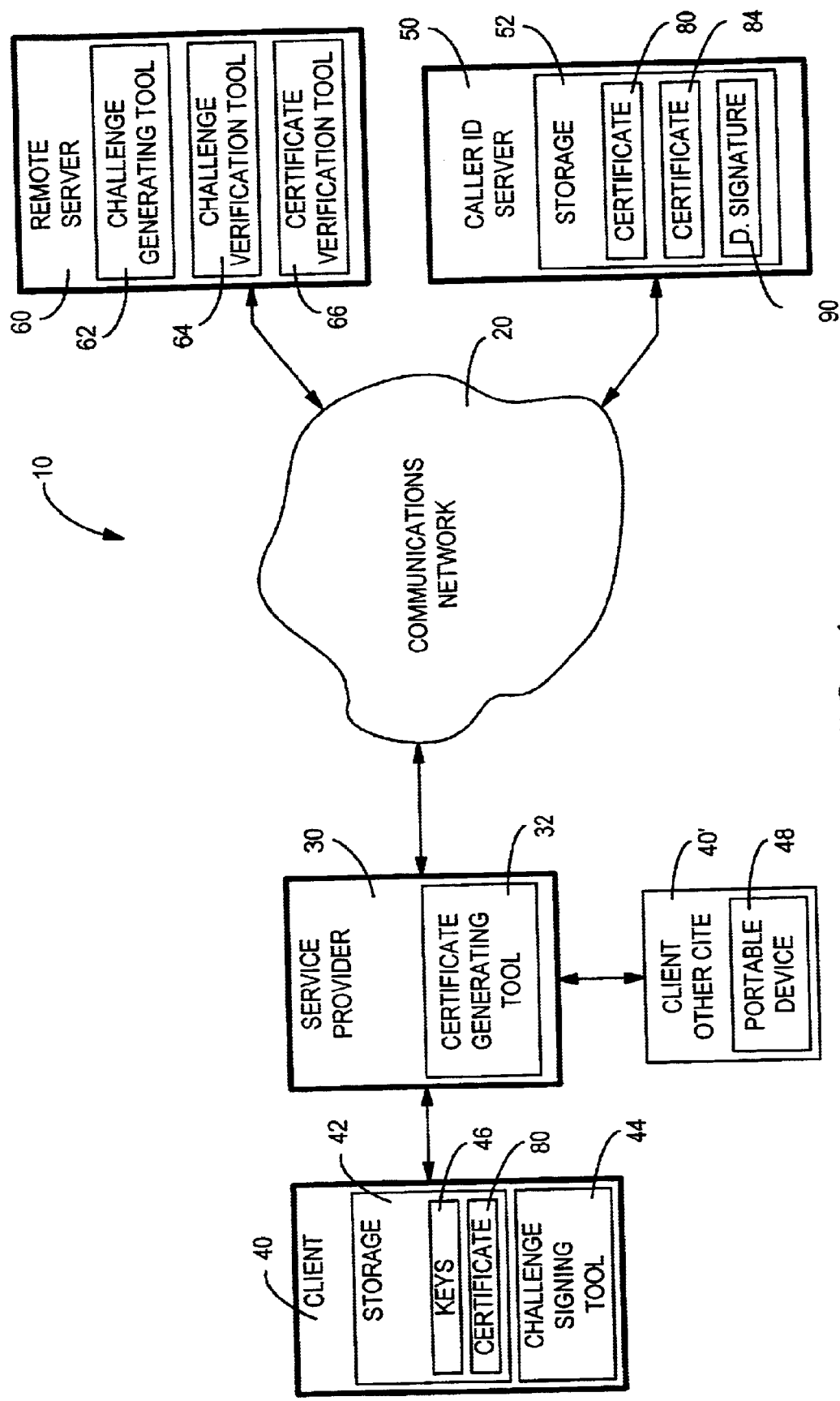
FIG. 1 is a diagrammatic presentation illustrating the system for authenticating a client requesting certification, according to the present invention.
Figure 2A:
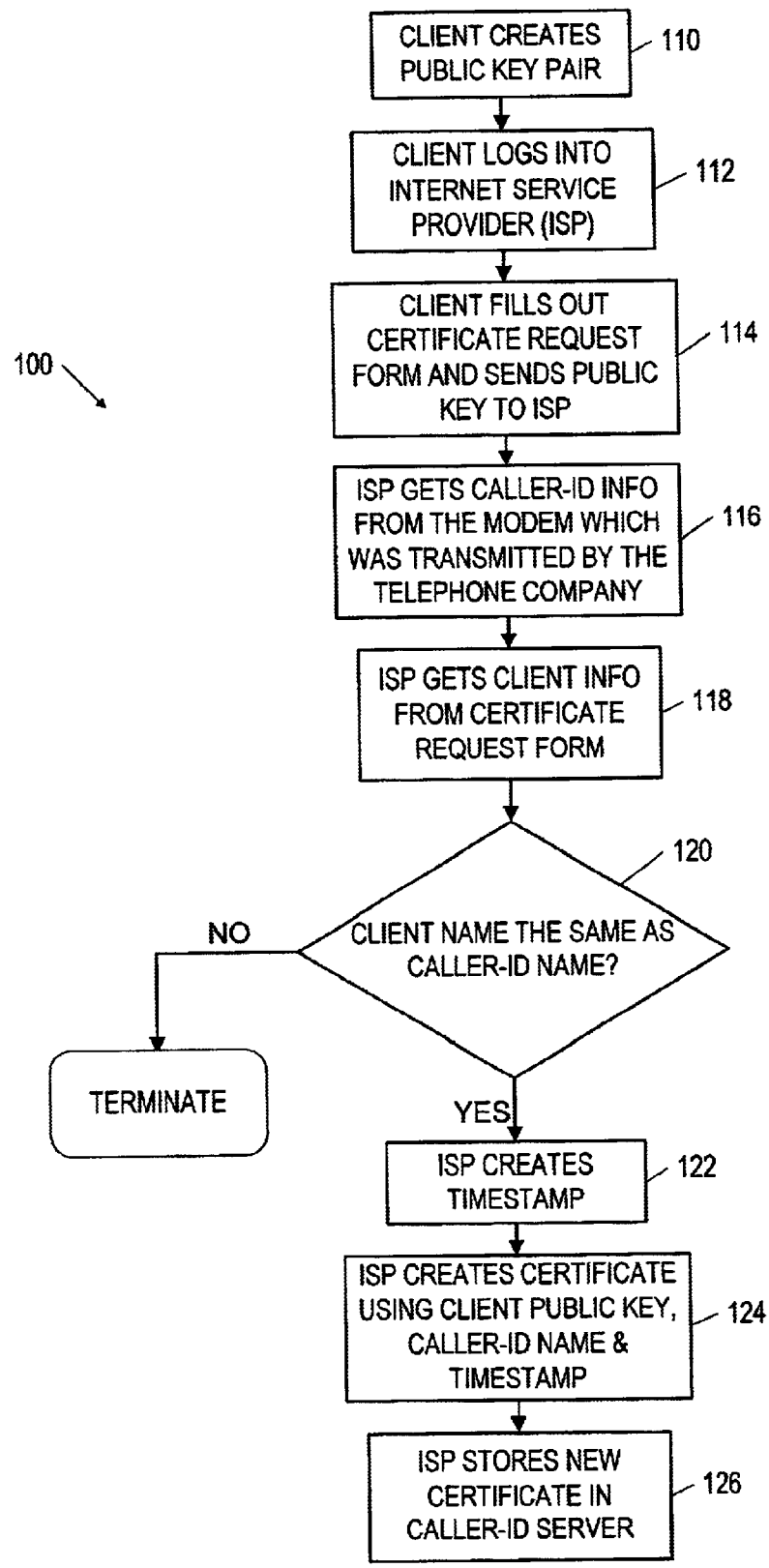
FIG. 2a is a flow chart illustrating the preferred process for generating certificates using caller-ID.

FIG. 1 illustrates a caller ID authentication system 10. As shown, the system 10 has a communications network 20, which can be the Internet, or the like. A service provider 30 is connected to the communications network 20 and a client 40 to provide communications-related services to the client 40. The service provider 30 can be an Internet Service Provider (ISP) or a telephone service company. The client 40 is broadly defined as a user who uses the network 20 or a device to allow the user to access the network 20. Thus, the client 40 can be a personal computer (PC), a land-line telephone, a dedicated communications line (such as DSL), a wireless telephone or another portable communication device. The connection between the service provider 30 and the client 40 can be a land-line or a wireless channel, so is the connection between the service provider 30 and the network 20. The client 40 is capable of providing a key pair 46, which includes a private key and a public key to be stored in a storage area 42. Furthermore, the client 40 has a challenge-signing tool 44 to allow the client 40 to sign a challenge. The service provider 30 is capable of collecting client information and signing the client information into a certificate using a certificate generating tool 32. Also connected to the communications network 20 are a remote server 60, which has a tool 62 for generating challenges and sending the challenges to the client 40 for authentication purposes, and a caller-ID server 50, which has a storage 52 for storing certificates provided by the service provider 30 or the client 40. The remote server 60 also has a challenge-verification tool 64 and a certificate verification tool 66. If the client 40 wishes to purchase an item through the network 20, usually he must provide identification. If the client 40 uses a telephone to access the network 20, for example, the telephone number can serve as an identification known as a caller-ID. In general, however, the client 40 provides some client information, which may include a name, the client public key, or a telephone number to the service provider 30, as a form of caller identification. A process 100 for establishing the identity of the client 40 is shown in FIG. 2a. With such identification, the client 40 maybe able to make a purchase or to make a payment through the network 20.

As shown in FIG. 2a, the client 40 creates a key pair 46 including a private key and a public key, at step 110. The client 40 logs into the service provider 30 at step 112, via an authenticated channel or a wireless connection. If feasible, an SSL session from a browser could also be used as a secure connection between the client. In order to provide client information to the service provider 30, the client 40 may have to fill out a certificate request form with the client information and provide the form to the service provider 30 at step 114. At step 116, the service provider 30 collects the client's caller-ID transmitted by a telephone company from the modem. In this case, the telephone company provides the physical connection between the service provider 30 and the client 40. In some cases, the service provider 30 is the telephone company. The service provider 30 also obtains client information from the certificate request form, at step 118. At step 120, the service provider 30 checks the client's name against the caller-ID name. If they are the same, then the process will continue at step 122. Otherwise, the process is terminated. At step 122, the service provider 30 creates a time-stamp indicative of the time at which the client information is collected, and subsequently, a certificate 80 is created using client public key, caller-ID name and the time-stamp, at step 124. In some cases, all of the caller-ID information (name and telephone number) is included in the certificate 80. In the case where the caller's name is not provided as part of the caller-ID, the name will be looked up in a database that uses the caller's number as its primary key. From the received information, the service provider 30 uses the tool 32 to sign client information with a certified key set into a provider's digital signature, and stores a certificate 80 (the provider's digital signature and the client information) to the caller ID server 50 at step 126. Optionally, the certificate 80 can be given to the client 40 to be stored in the storage 42 so that the client 40 can provide the certificate 80 to the remote server 60 upon request. It will be understood that the certificate 80 may be returned to the client 40 in an e-mail message. The signing process can be performed by the service provider 30 or by the telephone company. The certificate 80 can be used for authenticating the client 40.

Figure 2B:
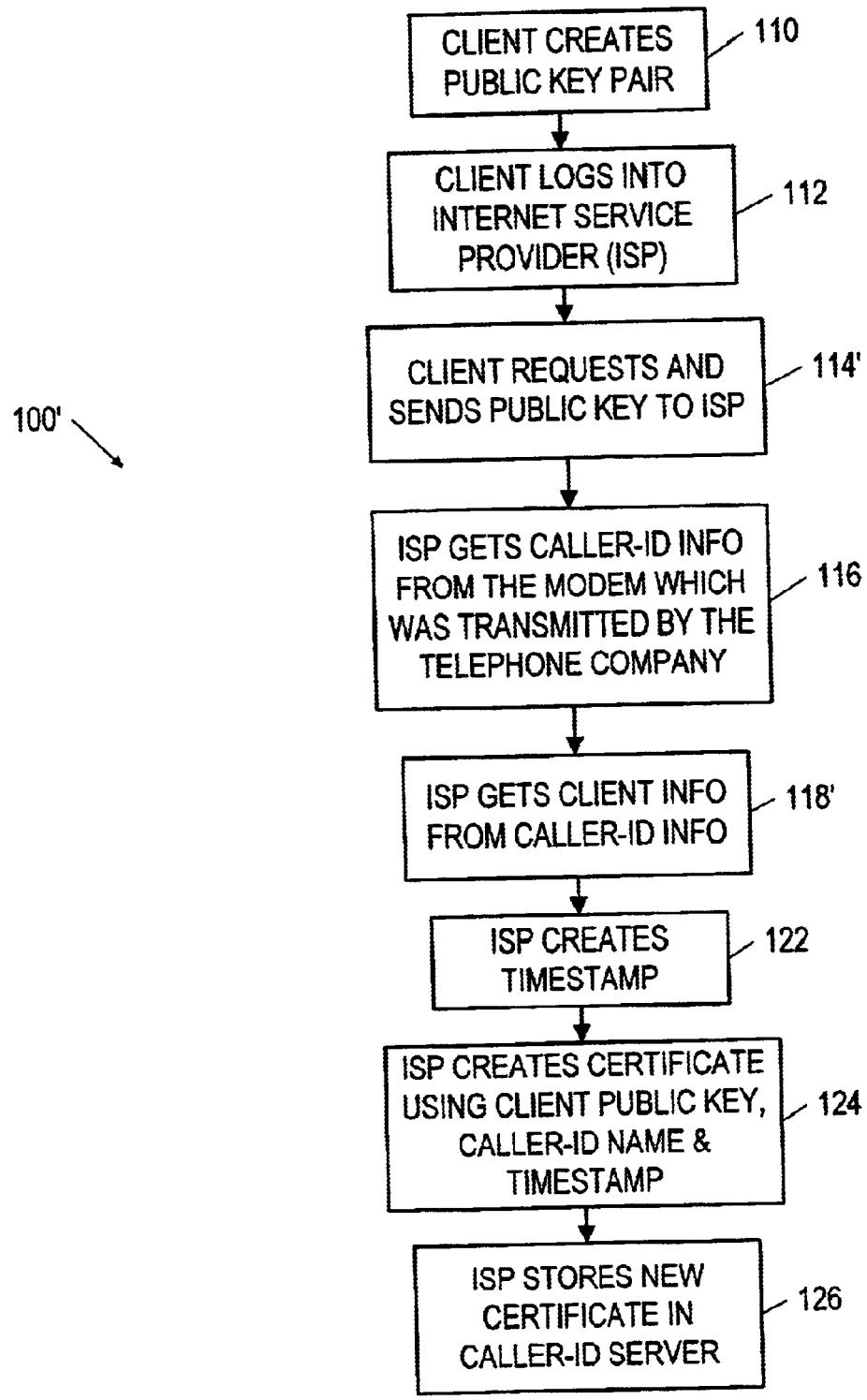
FIG. 2b is a flow chart illustrating an alternative process for generating certificates using caller-ID.

In an alternative way, as shown in FIG. 2b, the client 40 requests a certificate and sends his public key to the service provider 30 at step 114' without filling out a certificate request form. Thus, at step 118', the service provider 30 obtains the client information from the caller-ID information from the modem, instead of the certificate request form. In that case, the service provider 30 skips the step of checking the client's name against the caller-ID name.

Figure 3:
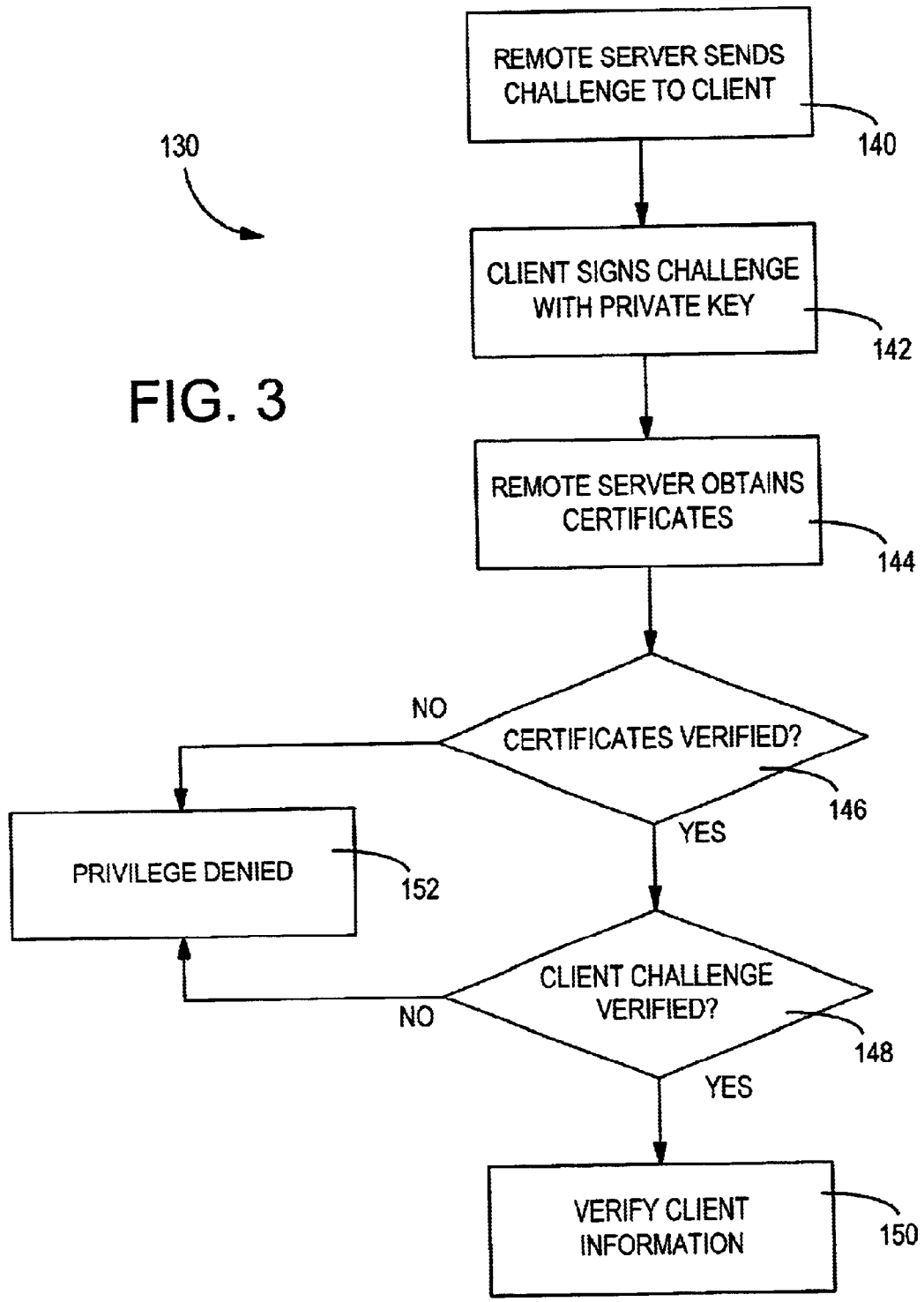
FIG. 3 is a flow chart illustrating the processes for verifying certificates.

With the certificate 80, the client 40 can be authenticated by the remote server 60. The authentication process 130 is shown in FIG. 3. For example, the client 40 is subjected to authentication regarding a credit card sale. At step 140, the remote server 60 uses the challenge-generating tool 62 to generate and send a challenge to the client 40. The challenge may include a purchase order for the credit card sale. At step 142, the client 40 uses the challenge-signing tool 44 to sign the challenge and sends the signed challenge including the client's digital signature to the remote server 60. At step 144, the remote server 60 retrieves the certificate 80 from the caller ID server 50. Alternatively, the remote server 60 retrieves the certificate 80 directly from the client 40 if available. The remote server 60 may use public key conventional protocols 66, such as X.509, to verify one or more certificates at step 146. It should be noted that the remote server 60 may also have a provider's certificate 84 on file. Furthermore, a certificate authority (CA, not shown), who has a CA certificate, may also be involved in the authentication process. Preferably, all certificates (client's, provider's and CA's) involved in the authentication process are verified. If the verification process at step 146 fails to verify the necessary certificate 80 and 84, then the credit card purchase is rejected at step 152. Thus, the client 40 is denied the privilege for making that purchase through the network 20. When the verification process at step 146 is successful, the remote server 60 uses the challenge verification tool 64 to verify at step 148 the digital signature on the signed challenge with the client public key obtained from the certificate 80. If the challenge verification at step 148 is successful, then the client information obtained from the client certificate 80 can be used to verify credit card information at step 150. Otherwise, the credit card purchase is likewise rejected at step 152.

It should be noted that the authentication process, according to the present invention, can be used with a land-line connection or with wireless phones. Wireless phones can also have a chip with a unique ID that the service provider uses to authenticate the wireless connections.

For the purpose of collecting sales taxes, if applicable, the authentication of caller-ID over the Internet can be applied to identifying the location where a purchase is initiated. In this case, the remote server would challenge the service provider to sign a statement that includes the caller ID and challenge. The structure of the caller ID number will be used to identify the tax district of the purchaser.

For the purpose of identifying a client who applies for a postal meter, for example, the caller ID can be used to identify the licensing ZIP code for the meter license.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for creating a service provider of a communications network to create a certificate for a client of the service provider, said method comprising:

establishing a communications link between the client and the service provider through a dedicated communication channel;

receiving a request from the client, via the communications link, to create a client certificate for the client;

obtaining information identifying the client from an operator of the dedicated communication channel, the information identifying the client being based on the communications link; and in response to obtaining the information identifying the client, creating the requested client certificate using the obtained information identifying the client.

2. The method of claim 1, further comprising:

verifying that the information identifying the client obtained from the operator of the dedicated communication channel is the same as client information provided by the client in the received request for the client certificate.

3. The method of claim 1, further comprising:

collecting client information from the client; and signing the client information into the certificate.

4. The method of claim 1, wherein the client certificate includes a time-stamp for recording the time at which the certificate is created.

5. The method of claim 1, wherein the communications network is the Internet and the service provider is an Internet service provider.

6. The method of claim 1, wherein the service provider includes a telephone service company.

7. The method of claim 1, wherein the operator of the dedicated communication channel is a telephone company and the information identifying the client is a caller ID.

8. The method of claim 7, wherein the caller ID includes a phone number of a client's telephone at a first site, said method further comprising:

generating an additional certificate having a value indicative of a communication device used by the client at a second site different from the first site, and verifying the additional certificate with a public key of the client.

9. The method of claim 8, wherein the value includes a MAC address of the communication device.

10. A system for a service provider of a communications network to create a certificate for a client of the service provider, said system comprising:

means for establishing a communications link between the client and the service provider through a dedicated communication channel;

means, responsive to a request received from the client via the communications link to create a client certificate for the client, for providing a first signal indicating the client's request for the client certificate;

means, responsive to the first signal, for obtaining information identifying the client from an operator of the dedicated communication channel, the information identifying the client being based on the communications link, and for providing a second signal indicating the obtained information identifying the client; and means, responsive to the second signal, for creating the requested client certificate using the obtained information identifying the client.

11. The system of claim 10, further comprising means, responsive to the second signal, for verifying that the information identifying the client obtained from the operator of the dedicated communication channel is the same as client information provided by the client when requesting the client certificate.

12. The system of claim 10, further comprising means for collecting client information from the client, and signing the client information into the certificate.

13. The system of claim 10, wherein the communications network is the Internet and the service provider is an Internet service provider.

14. The system of claim 10, wherein the service provider includes a telephone service company.

15. The system of claim 10, wherein the operator of the dedicated communication channel is a telephone company and the information identifying the client is a caller ID.

16. The system of claim 15, wherein the caller ID includes a phone number of a client's telephone at a first site, said system further comprising:

means for generating an additional certificate having a value indicative of a communication device used by the client at a second site different from the first site, and means for verifying the additional certificate with a public key of the client.

17. The system of claim 16, wherein the value includes a MAC address of the communication device.

* * * * *